(12) United States Patent
Wen et al.

(10) Patent No.: US 8,189,880 B2
(45) Date of Patent: May 29, 2012

(54) INTERACTIVE PHOTO ANNOTATION BASED ON FACE CLUSTERING

(75) Inventors: Fang Wen, Beijing (CN); Rong Xiao, Beijing (CN); Qiong Yang, Leuven (BE); Xiaoou Tang, Hong Kong (CN)

(73) Assignee: Microsoft Corporation, Redmond, WA (US)

( * ) Notice: Subject to any disclaimer, the term of this patent is extended or adjusted under 35 U.S.C. 154(b) by 995 days.

(21) Appl. No.: 11/754,933

(22) Filed: May 29, 2007

(65) Prior Publication Data
US 2008/0298766 A1 Dec. 4, 2008

(51) Int. Cl.
*G06K 9/00* (2006.01)
*G06K 9/62* (2006.01)

(52) U.S. Cl. .................. 382/118; 382/225

(58) Field of Classification Search .......... 382/115, 382/118, 209, 218, 224–225, 305
See application file for complete search history.

(56) References Cited

U.S. PATENT DOCUMENTS

| | | | |
|---|---|---|---|
| 6,128,446 A | 10/2000 | Schrock et al. | |
| 7,010,751 B2 | 3/2006 | Shneiderman | |
| 7,028,253 B1 | 4/2006 | Lieberman et al. | |
| 7,068,309 B2 | 6/2006 | Toyama et al. | |
| 7,536,029 B2 * | 5/2009 | Choi et al. | 382/103 |
| 7,702,185 B2 * | 4/2010 | Keating et al. | 382/305 |
| 7,756,334 B2 * | 7/2010 | Kim et al. | 382/181 |
| 7,783,085 B2 * | 8/2010 | Perlmutter et al. | 382/118 |
| 2003/0210808 A1 * | 11/2003 | Chen et al. | 382/118 |
| 2004/0021780 A1 | 2/2004 | Kogan | |
| 2004/0201676 A1 | 10/2004 | Needham | |
| 2004/0264780 A1 | 12/2004 | Zhang et al. | |
| 2005/0111737 A1 * | 5/2005 | Das et al. | 382/190 |
| 2006/0198559 A1 * | 9/2006 | Manico et al. | 382/305 |
| 2007/0222565 A1 * | 9/2007 | Kawamata et al. | 340/435 |
| 2007/0230799 A1 * | 10/2007 | Shniberg et al. | 382/224 |
| 2007/0271524 A1 * | 11/2007 | Chiu et al. | 715/767 |

FOREIGN PATENT DOCUMENTS
WO WO2006002745 A1 1/2006

OTHER PUBLICATIONS

Cui, et al. "Easy Album: An Interactive Photo Annotation System Based on Face Clustering and Re-ranking", pp. 367-376, May 3, 2007.*
Suh, et al. "Semi-Automatic photo annotation strategies using event based clustering and clothing base person recognition", pp. 524-544, Mar. 2007.*
Suh "Image Management Using Pattern Recognition Systems: Semi-Automatic Photo Annotation", University of Maryland, pp. 99-154, 2005.*

(Continued)

*Primary Examiner* — Daniel Mariam
(74) *Attorney, Agent, or Firm* — Lee & Hayes, PLLC

(57) ABSTRACT

An interactive photo annotation method uses clustering based on facial similarities to improve annotation experience. The method uses a face recognition algorithm to extract facial features of a photo album and cluster the photos into multiple face groups based on facial similarity. The method annotates a face group collectively using annotations, such as name identifiers, in one operation. The method further allows merging and splitting of face groups. Special graphical user interfaces, such as displays in a group view area and a thumbnail area and drag-and-drop features, are used to further improve the annotation experience.

18 Claims, 12 Drawing Sheets

OTHER PUBLICATIONS

Ahonen et al, "Face Recognition with Local Binary Patterns," Proc. the 8th European Conference on Computer Vision, 2004, pp. 469-481.

Bach et al, "Learning Spectral Clustering," Proc. of Neural Info. Processing Systems, 2003, 8 pgs.

Chen et al, "Face Annotation for Family Photo Album Management," International Journal of Image and Graphics, vol. 3, No. 1, Dec. 30, 2002, pp. 1-14.

Kustanowitz, et al., "Motivating Annotation for Personal Digital Photo Libraries: Lowering Barriers While Raising Incentives", available at least as early as Feb. 12, 2007, at <<http://hcil.cs.umd.edu/trs/2004-18/2004-18.pdf>>, pp. 1-10.

Platt, "AutoAlbum: Clustering Digital Photographs Using Probabilistic Model Merging," available at least as early as May 29, 2007, at <<http://research.microsoft.com/~jplatt/autoAlbum/cbaivl.pdf>>, 2000, pp. 1-6.

Platt et al, "PhotoTOC: Automatic Clustering for Browsing Personal Photographs," available as least as early as May 29, 2007, at <<http://research.microsoft.com/~jplatt/PhotoToC-pacrim.pdf>>, 3 pgs.

Smeulders et al, "Content Based Image Retrieval at the End of the Early Years," ISIS Technical Report Series, vol. 2000-22, Dec. 1, 2000, pp. 1-69.

Suh, et al., "Semi-Automatic Image Annotation Using Event and Torso Identification", available at least as early as Feb. 12, 2007, at <<http://hcil.cs.umd.edu/trs/2004-15/2004-15.pdf>>, pp. 1-4.

Viola et al, "Rapid Object Detection Using a Boosted Cascade of Simple Features," Proc. of IEEE Conference on Computer Vision and Pattern Recognition, 2001, pp. 1-9.

Wenyin, et al., "MiAlbum-A System for Home Photo Management Using the Semi-Automatic Image Annotation Approach", ACM, 2000, pp. 479-480.

Wenyin, et al., "Semi-Automatic Image Annotation", available at least as early as Feb. 12, 2007, at <<http://research.microsoft.com/~marycz/semi-auto-annotatoin—full-pdf>>, pp. 1-8.

Zhang et al, "Automated Annotation of Human Faces in Family Albums," Proc. of ACM Mulitmedia, Nov. 2-8, 2003, 4 pgs.

Zhao et al, "Face Recognition: A Literature Survey," ACM Computing Surveys, vol. 35, No. 4, Dec. 2003, pp. 399-459.

* cited by examiner

INTERACTIVE PHOTO ANNOTATION BASED ON FACE CLUSTERING

BACKGROUND

With the rapid development of digital cameras and scanners, digital photographs are becoming a commodity, especially since the cost of taking a digital photo is virtually free of charge. As a result, digital photographs can accumulate rapidly, and automated tools for organizing digital photographs have become extremely desirable. However, available commercial products are still lacking in effectively organizing digital photographs of individuals in everyday situations (e.g., photos in a family photo album). For example, traditional photo management systems only utilize the time or album/directory information which can be reliably extracted to help the user manage the photos. These types of information alone are insufficient to achieve good organization and search performance.

An intuitive way to organize digital photos is to annotate photos using semantics relevant to photographic content. For example, semantic keywords, such as who is in the photo, where and when the photo was taken, what happened, and what kind of photo it is (e.g., portrait, group, or scenery), may be used for photo organization. However, manually entering such semantic keywords is slow and tedious, given the large quantity of photos in most digital photo albums. On the other hand, due to technical difficulties in automatic recognition of face, scene and event, existing methods cannot guarantee an accurate result if the annotation process is fully automatic.

Many contemporary software programs still do annotation manually. These programs allow users to either label photos one by one, or manually select the photos that are believed to have the same label, and apply label to be photos upon selection. Other programs use a certain level of automation. For example, automation feature batch annotation or bulk annotation is widely adopted in commercial photo album management software. Batch annotation is often combined with drag-and-drop style user interfaces to further facilitate the annotation process.

Although the existing automation techniques and photo annotation user interfaces do reduce workload compared to annotating images one by one, users still have to manually select photos to put them in a batch before performing batch annotation. This is especially boring for name annotation (annotation using a name identifier of a person who is in a photo), because before each annotation, users need to recognize every person in the candidate photos and manually verify that the selected photos do contain a certain person. People may have less motivation to invest the effort in annotating their photos due to heavy workload of manual annotation. More likely they will just store their photos in hard disk without annotation.

There are also some existing methods that try to leverage the potential of Internet to alleviate the pain of tagging photos, by encouraging the Web users to label the photos online, or by implicitly labeling the keywords of photos in games. However, these Internet based annotation methods still require extensive labeling and tagging. Moreover, people are not always willing (or capable) to label photos of others, and some may be unwilling to share their family albums to the public over the Internet.

Some newer programs use the idea of time-based clustering to make the selection of photos automatically according to the times the photos were taken. This can be fairly easy to implement because digital photos tend to have meta-data including the time feature that can be easily extracted. Time-based clustering does help in organizing and browsing photos, but contributes little to annotating photos based on the photo content such as the people and other subjects of the photo.

In recent years, remarkable progress has been made in computer vision. Especially, the performance of automatic face detection method has improved significantly. This allows digital photo management programs to detect faces in photos and then enable the users to label these faces directly without first having to manually find them in the photo album. In these methods, however, each face still needs to be annotated one by one, thus requiring an amount of labor comparable to annotating directly on photos, except for the time saved for finding the photos with faces.

SUMMARY

Interactive photo annotation using a clustering technique based on facial similarities is described. A face recognition algorithm is used to extract facial features of a photo album and cluster the photos in the album into multiple face groups (clusters) based on facial similarity. A cluster annotation technique places similar faces together into groups or clusters, and enables user to label a group or cluster collectively in one operation. Face clustering may be further assisted by taking into consideration torso feature similarities and photo time similarities. In some embodiments, the face clustering is combined with time clustering based on time tags and location/event clustering based on photo content such as scene similarities.

One aspect of the annotation is a contextual re-ranking technique which improves the labeling productivity by dynamically re-ranking the displayed groups or individual photos based on the detected user intention. Another aspect is an ad hoc annotation which allows the user to annotate photos while browsing or searching photos. The annotation information entered by the user is accumulated and utilized for subsequent clustering, thus progressively improving system performance through learning propagation. Special graphical user interfaces, such as displays in group view area and thumbnail area, and drag-and-drop feature, are used to further improve the annotation experience.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE FIGURES

The detailed description is described with reference to the accompanying figures. In the figures, the left-most digit(s) of a reference number identifies the figure in which the reference number first appears. The use of the same reference numbers in different figures indicates similar or identical items.

DETAILED DESCRIPTION

Introduction

The interactive photo annotation described herein has several aspects as described in the following.

Cluster Annotation—The method includes an annotation UI called cluster annotation which annotates photos by clusters instead of one by one. The UI includes two parts. The first is automatic clustering, which groups photos/faces with similar scene/facial features into clusters. Another is a set of pre-defined interactive annotation operations, which enables user to conduct photo/face annotation on clusters directly. With this UI design, the annotation workload is significantly reduced.

Figure 1:
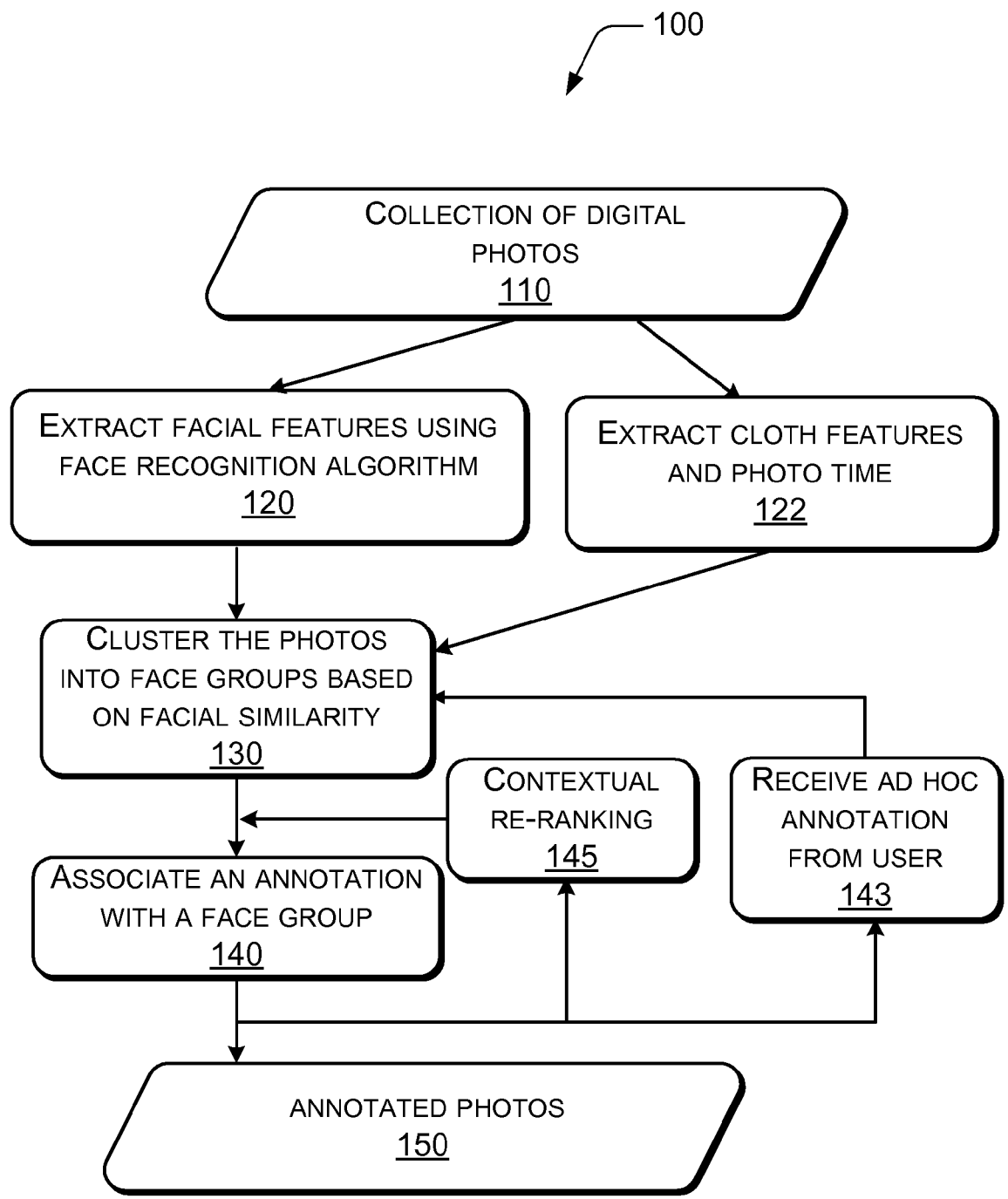
FIG. 1 shows a block diagram of an exemplary interactive annotation process based on face clustering.

FIG. 1 shows a block diagram of an exemplary interactive annotation process based on face clustering. The interactive photo annotation process 100 starts at block 110 with a collection of digital photos, such as a digital photo album. At block 120, the method extracts facial features of the digital photos using a suitable face recognition algorithm. At block 122, the method additionally extracts cloth features (or other types of torso features) and photo time. At block 130 the method clusters digital photos into face groups based on facial similarity. Each face group may have one or multiple digital photos each having a facial feature satisfying a facial similarity requirement. The facial similarity requirement may be set according to the purpose of clustering. For example, if the purpose of clustering is to group faces of the same person together, the facial similarity requirement may be a preset threshold of facial similarity at or beyond which point the faces can be considered to be that of the same person. If the purpose of clustering is to preliminarily group faces into a number of evident clusters to allow iterative user annotation, the facial similarity requirement may set a similarity level (e.g. the maximum similarity) suitable to the current clustering stage such that the faces of each cluster most likely belong to a single individual. In this case, the similarity level may be different for different iterations of clustering. If the purpose of clustering is to identify faces of a certain type of people, a different facial similarity requirement may be set for such a purpose. In addition, for different types of people, the facial similarity threshold for identifying an individual or a group may be different.

Different face recognition techniques may have different ways to characterize and quantify facial similarities. For example, a face distribution may be modeled as multi-Gaussian plus a uniform noisy distribution, and a threshold may be set as a range or window in the modeled face distribution such that faces falling into the range or window are considered to be that of the same person. In addition, as the process 100 is usually implemented in a computer-executable program, the facial similarity requirements, such as preset thresholds, are preferably incorporated in the computer-executable program.

In some embodiments, the clustering at block 130 may be further assisted by cloth features (or other types of torso features) extracted at block 122. The clustering at block 130 may also be assisted by photo time information extracted at block 122. For example, photos that were taken on the same day and have a similar torso feature (e.g., have the same cloth color) are more likely to be that of the same person, especially if the photos also share a facial similarity. Using these combined features for clustering may increase the confidence level and accuracy of the clustering at block 130. The torso feature similarity requirement and photo time similarity requirement used for further clustering may be implemented in a way similar to how facial similarity is implemented as described above. For example, a preset threshold of torso feature similarity and a preset threshold of photo time similarity may be incorporated in the computer-executable program.

With clustered face groups, the user may annotate an entire face group in one labeling action, as indicated at block 140. For example, the user may enter an identifier of a person (e.g., a name) to a face group such that the identifier is associated with multiple photos (preferably all photos) of the face group. The face group annotation at block 140 may be performed on as many as face groups as desired, and may also be reiterated multiple times on the same face group. The interactive photo annotation process 100 yields annotated photos 150.

Optional ad hoc annotation may be performed at block 143 to further assist the clustering at block 130. Furthermore, optional contextual re-ranking may be performed at block 145 to further assist the annotation at block 140 by making the annotation more interactive. The details of ad hoc annotation and contextual re-ranking are discussed in later sections of this description.

A face group may be modified by removing a photo from the face group. Once removed, the photo may be dissociated with the annotation of the face group. Face groups associated with an identical annotation may be automatically merged. The user may also manually merge two face groups. Once merged, the two face groups may be automatically associated with the same annotation.

To display the face groups, an image representation of each face group may be created and displayed. In a preferable user interface, each image representation is selectable (e.g., mouse clickable) by the user to choose the face group represented by the image representation. The image representations of the face groups may be displayed in a designated group display area. At the same time, thumbnail of photos of a face group selected by the user may be displayed in another view area.

In addition to clustering based on face similarity, the photo album may also be clustered into event and/or location groups to allow the user to collectively annotate an event/location group using event/location annotation.

Contextual Re-ranking—The method provides a context-sensitive environment adaptive to the user's interactions. The method allows the user to select a target face group, then dynamically ranks face groups according to face similarity of each face group to the target face group, and displays the face groups according to a result of the ranking. The method may further allow the user to select a target photo from the target face group, rank photos of the target face group according to face similarity of each photo to the target photo, and display the photos of target face group according to a result of the ranking.

Contextual re-ranking helps to relieve the burden of users by predicting user intentions. During the interaction of the user and the system, the operations of the user tend to reflect the intention of the user. The method guesses this intention and re-ranks the photos or clusters to be labeled. For example, when the user clicks a photo or a cluster, it indicates his/her attention on this photo or cluster. The system therefore re-ranks the photos or clusters and arranges the similar ones close to the clicked photo or cluster. With the proximity of similar photos or clusters, the user will find it easier to label. The contextual re-ranking therefore boosts labeling productivity of users.

Ad hoc annotation—The method also allows the user to annotate photos in an ad hoc manner when browsing or searching. For example, annotations may be entered by a user to one or more digital photos before face groups are formed by clustering. The annotation may also be entered after initial face groups are formed by clustering but utilized for subsequent re-clustering.

The ad hoc annotation information is accumulated gradually and then used to progressively improve the clustering and search results of unlabeled data. Unlike existing systems which are static and in which labeled data do not affect unlabeled data, the dynamic interaction between labeled and unlabeled data can significantly improve user experience since users can see improved browsing and retrieval results as they annotate.

In addition, the interactive photo annotation method is facilitated by a novel user interface (UI) to label with people's names, as well as locations and events. This UI is designed to work in a semi-automatic interactive way. The UI facilitates the interactions between users and the system in a variety of circumstances, and reduces the workload of labeling.

In one aspect, the UI includes a group view area and a thumbnail area. The group view area is used for displaying face groups of the photo album, and the thumbnail area is used for displaying thumbnails of multiple photos of a selected face group. The group view area may further have an annotation input interface via which the user can enter an annotation for a selected face group. The annotation input interface may have an annotation field listing existing annotations (e.g., names) that are enabled to be selected by the user. The listed annotations (e.g., names) may be automatically sorted or ranked according to the similarity between the face to be tagged and the tagged faces (i.e., faces that have already been associated with annotations or names). The annotation input interface may have an additional annotation field via which the user can manually enter the annotation for the selected face group. The displays (image representations) of face groups may be enabled for a drag-and-drop operation to merge two or more face groups. Likewise, the thumbnails of individual photos maybe enabled for a drag-and-drop operation to remove a photo from the selected face group or move a photo to another face group.

These aspects of the interactive photo annotation method are described in further detail below.

Cluster Annotation

Figure 2:
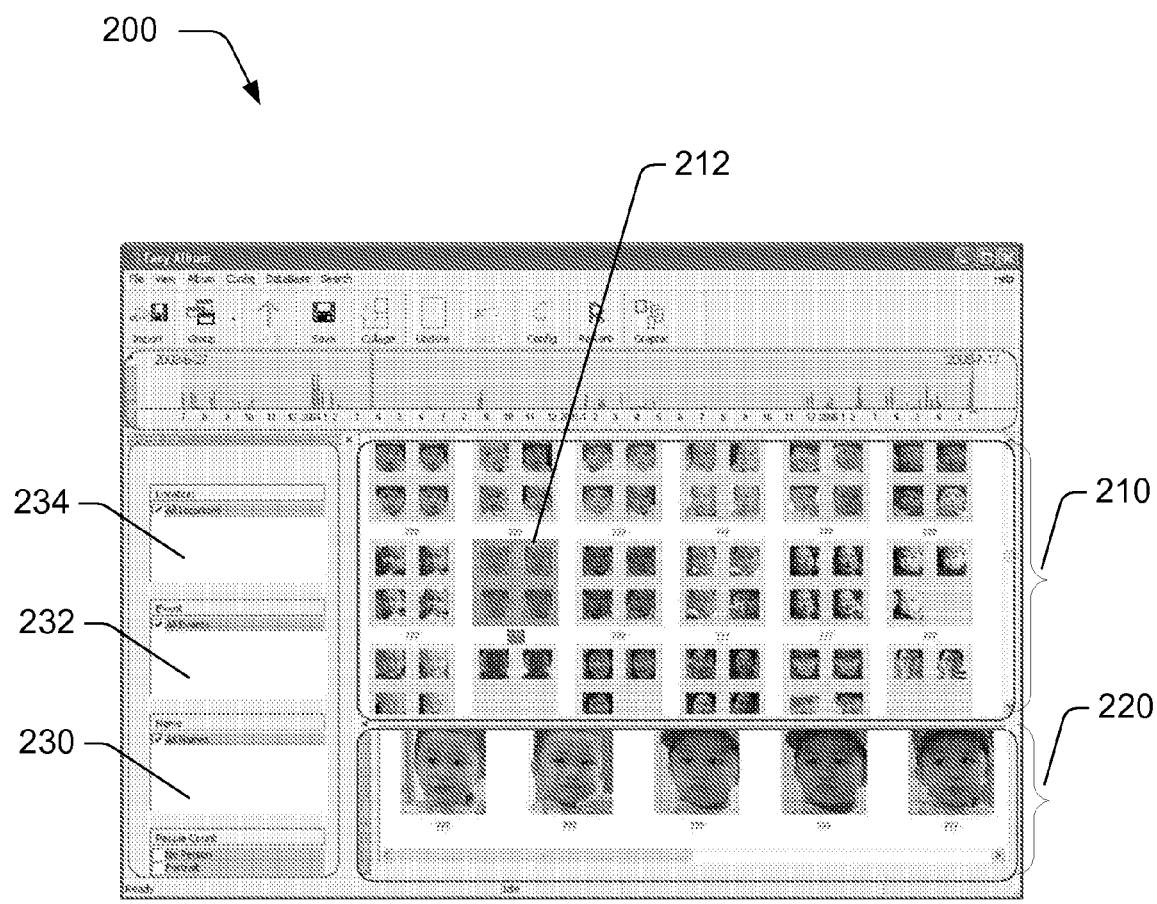
FIG. 2 shows an exemplary embodiment of user interface (UI) implementing the present interactive photo annotation method.

UI of cluster annotation—FIG. 2 shows an exemplary embodiment of UI implementing the present interactive photo annotation method. A Windows® Explorer style UI 200 is used to allow users to manipulate face groups in the similar way of manipulating folders and files in Window Explorer. Those who are familiar with Microsoft® Windows System will find it rather easy to use the system without much training.

As shown in FIG. 2, group view area 210 presents the thumbnails of face groups (e.g., face group 212) to the user, giving a preview of the faces contained in each face group and allows the user to label the corresponding face groups directly. The thumbnail of a face group is an image representation of the face group. It can be any format but preferably bears an image indicative of the photos contained in the corresponding face group to give a preview of the faces contained in the represented face group.

The face groups may be selectively displayed in group view area 210 based on a selection of the names made in name selector 230 in which "all names", individual names, or groups of names may be selected. The face groups may be further selected based on other selections such as event and location made in event selector 232 and location selector 234.

Thumbnail area 220 dynamically shows the faces of the currently selected face group 212, allowing users to observe the faces in a face group without double clicking and diving into the face group.

In UI 200, three operations are defined for face annotation, including cluster/single-face annotation, drag-and-drop, annotation deletion, which are explained in further detail below. Due to the limitation of clustering and face recognition algorithm currently available, a face cluster cannot be directly mapped to a person's name without user interaction. The faces of the same person may be scattered in several clusters, and occasionally different persons may be found in the same cluster. Therefore, face annotation may be carried out through a set of operations, such as cluster annotation, cluster merging and splitting. These operations enable user directly manipulate a group of photos instead of annotating them individually.

Figure 3:
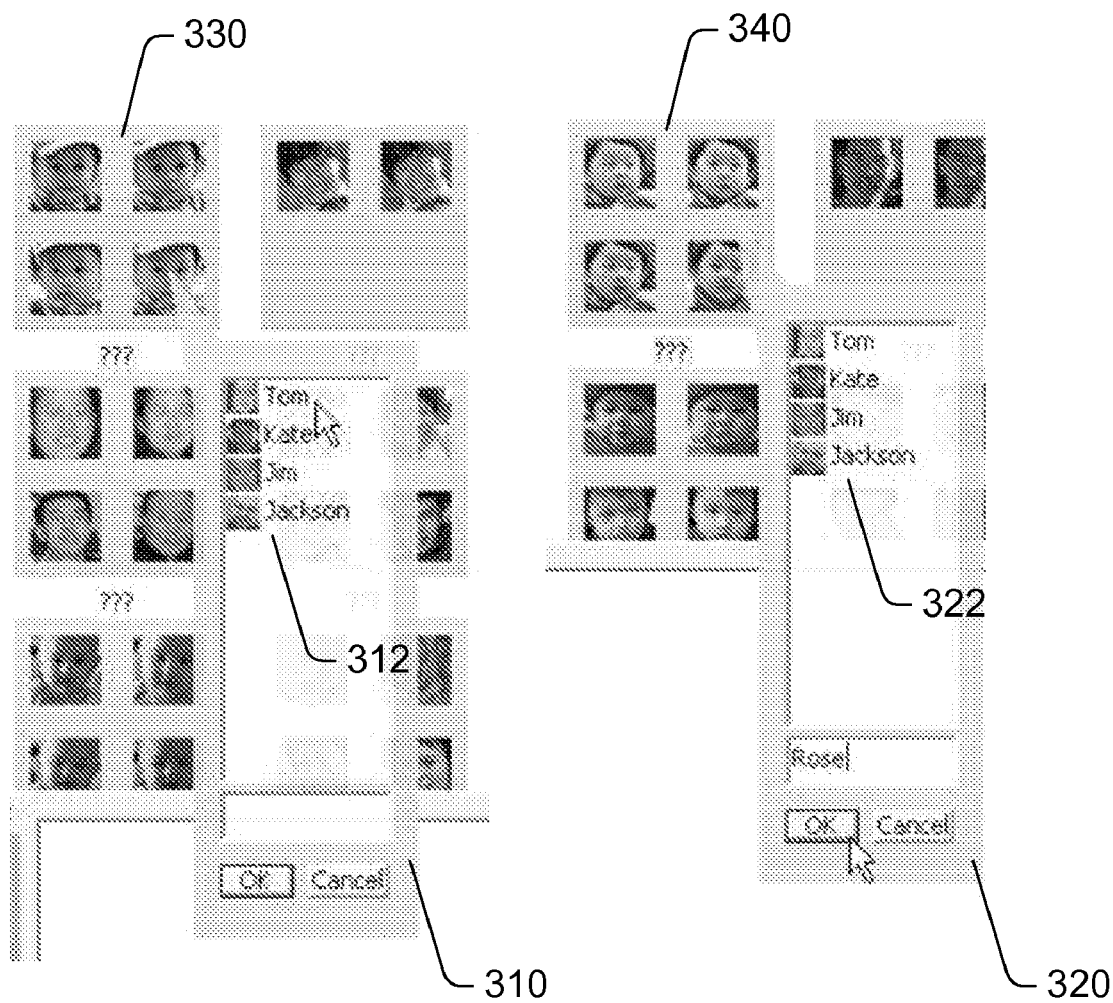
FIG. 3 shows an example of cluster annotation in which annotation is done by selecting an existing name or typing a new name.

FIG. 3 shows an example of cluster annotation in which an annotation is done by selecting an existing name or typing a new name. Cluster annotation is supported in pop-up context menu 310 or 320 which appears when the user right clicks on thumbnail 330 or 340 of a face group (which is displayed in group view area 210, for example).

The context menu 310 or 320 suggests the existing name tags 312 or 322 in the database. Each existing name tag corresponds to a tagged person which may be defined by automatic clustering and user annotation previously performed. The suggested name tags 312 or 322 are ranked according to the similarity between faces in the selected cluster and the faces of the tagged person. The user is allowed to select a name from the list of the suggested name tags 312 as shown in the context menu 310, or type in a new name as shown in the context menu 320. This further accelerates the speed of annotation. As demonstrated in FIG. 3, the user annotates (named) the selected face group 330 by clicking on a suggested name tag "Tom", and annotates the selected face group 340 by typing a new name "Rose".

The user interface of the present method supports drag-and-drop operation similar to that in Windows Explorer. User can drag faces or face groups (clusters) that have not been annotated to an annotated face group to cause an annotated name to be assigned to these drag-and-dropped faces or clusters. Similar drag-and-drop operation may be performed on a face or face group that has been incorrectly labeled to move the face for face group to a correctly labeled face group.

For example, the UI shown in FIG. 3 may also allow annotation with just a drag-and-drop operation after several names already exist in the database. If another face group has already been annotated as "Tom", for instance, the face group 330 may be dragged and dropped into that face group and automatically merged therewith to form a new face group annotated as "Tom". A similar context menu may also be used when the user right clicks or a thumbnail of a single photo (which is displayed in thumbnail area 220, for example).

Figure 4:
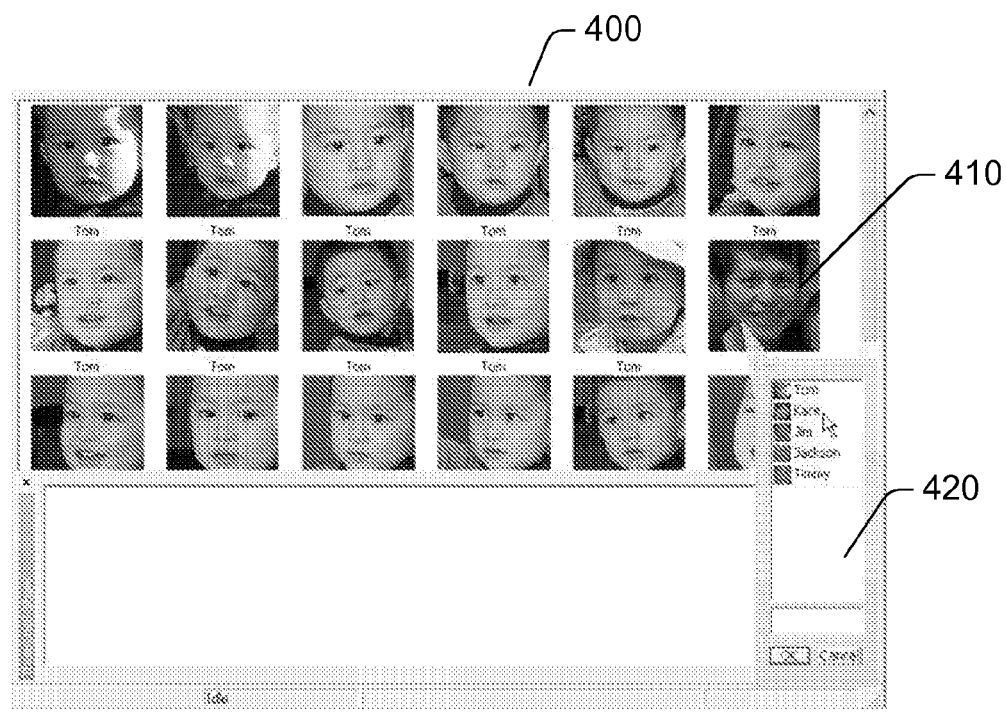
FIG. 4 shows an exemplary single face annotation.

FIG. 4 shows an exemplary single face annotation. Face group 400 contains a face 410 which is incorrectly labeled. To correct the incorrectly labeled face 410, the user can use single face annotation through pop-up context menu 420 which is displayed when the user right clicks on the incorrectly labeled face 410. Alternatively, the user may simply remove the incorrect face 410 from face group 400 using drag-and-drop described below.

Figure 5:
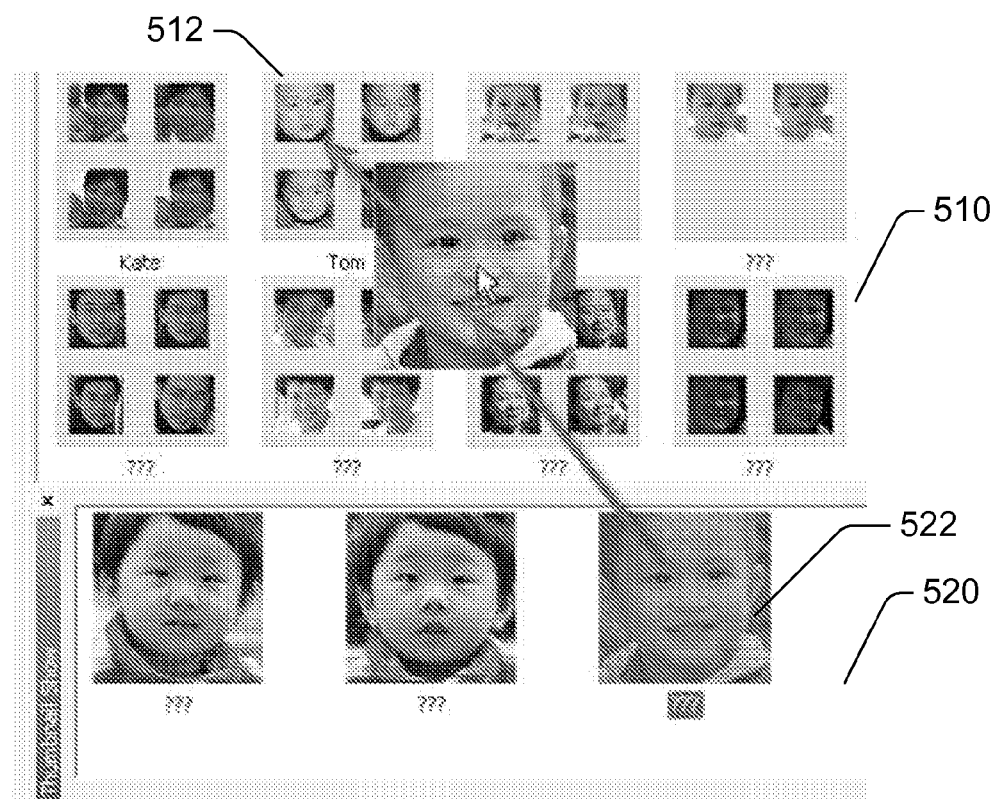
FIG. 5 shows an exemplary drag-and-drop operation performed on a single face.

FIG. 5 shows an exemplary drag-and-drop operation performed on a single face. An unlabeled face 522 is dragged from the thumbnail area 520 and dropped to face group 512 labeled "Tom" in the group view area 510. Upon dropping to face group 512, face 522 is automatically tagged to the name "Tom".

Figure 6:
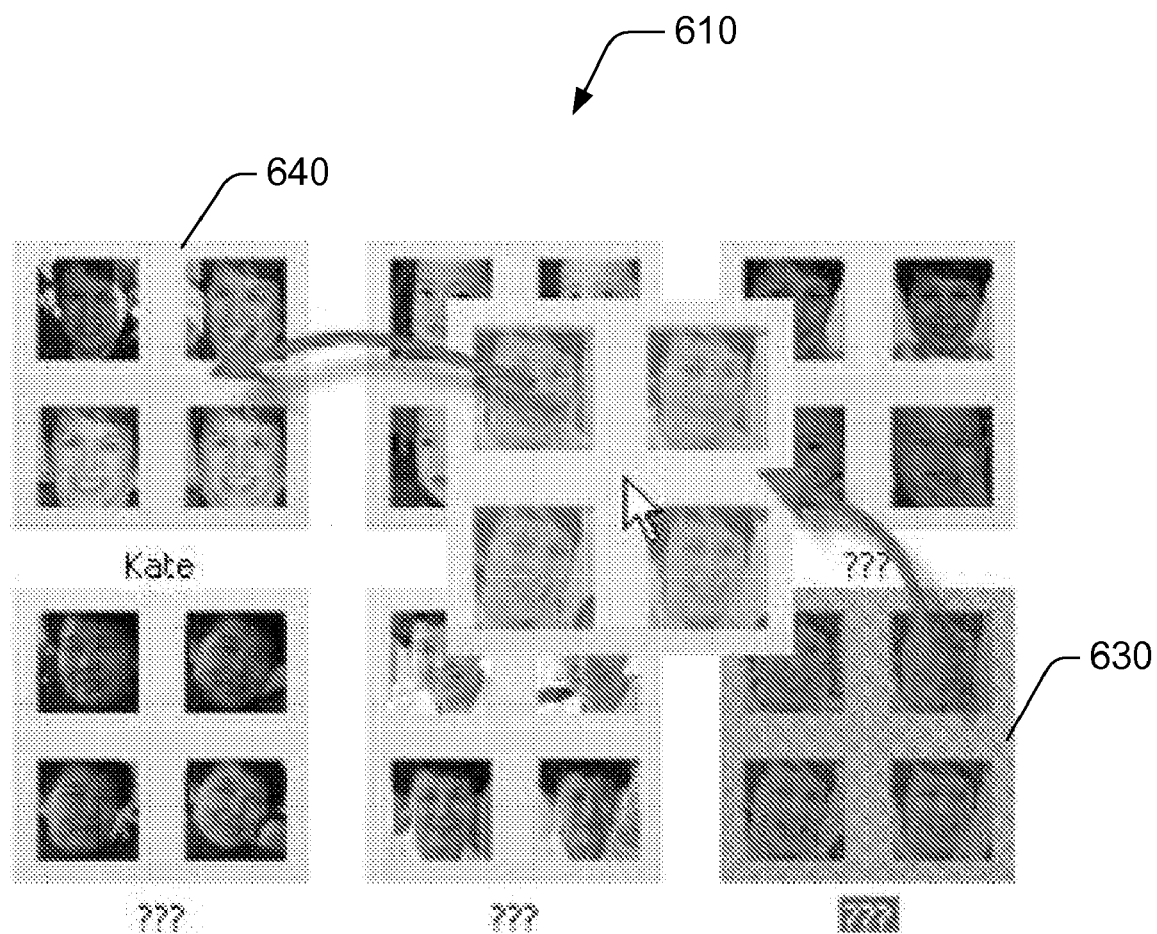
FIG. 6 shows an exemplary drag-and-drop operation performed on a face group.

FIG. 6 shows an exemplary drag-and-drop operation performed on a face group. Group view area 610 displays multiple face groups such as unlabeled face group 630 and labeled face group 640. The unlabeled face group 630 is dragged and dropped to face group 640 labeled "Kate". Upon dropping to face group 640, all faces in the dragged face group 630 are tagged to the name "Kate".

When users want to delete the name tags of a face that are already labeled, they can simply select the face and press DELETE on key board, and the name of the selected face will be automatically reset and the face moved to an "Unnamed" folder (similar to Recycle Bin in Windows®). The user may also achieve the same effect by drag-and-dropping the face to the "Unnamed" folder. A similar delete operation may be performed on multiple faces or face groups.

The Explorer Style UI as described above gives a friendly and efficient way of labeling photos. Especially, the ability to cluster similar faces/scenes together is a distinctive feature compared with contemporary photo management programs. Through drag-and-drop operations, as well as keyboard interactions, a user can accomplish the labeling job much more efficiently than using traditional methods.

The cluster-based annotation is distinctive to traditional annotation or tagging methods in that it takes advantage of the redundancy of a photo album. Modern digital photo albums are often redundant in nature. For example, for one photo there are often a group of photos similar to it, either in similar scene or have the same faces. The present method makes use of such redundancy by allowing the user to label groups of similar photos/faces in much fewer operations. In contrast, traditional methods tend to require the user to label the photos individually, and in some cases also to confirm selections, and usually involve a workload proportional to the size of the album when labeling scenes or faces.

In face cluster annotation, an automatic face clustering algorithm is started after photos are imported to the photo album management system. The face clustering algorithm clusters (groups) faces with similar appearances into face clusters or face groups each containing one or more photos having a face with similar appearance to facilitate collective annotation. Technical details of the clustering algorithm are described in Section Algorithm hereinafter.

Smart Cluster Merging and Splitting—Even with the state-of-the-art cluster algorithms, including the method described herein, cannot guarantee perfection of automatic clustering results. After clustering, a face group may contain faces of more than one person, and faces of the same person may also appear in more than one face group. To handle this effectively, the present method provides a flexible interactive mechanism to allow users to interfere in the process of labeling and correct the mistakes the algorithms have made.

Figure 7:
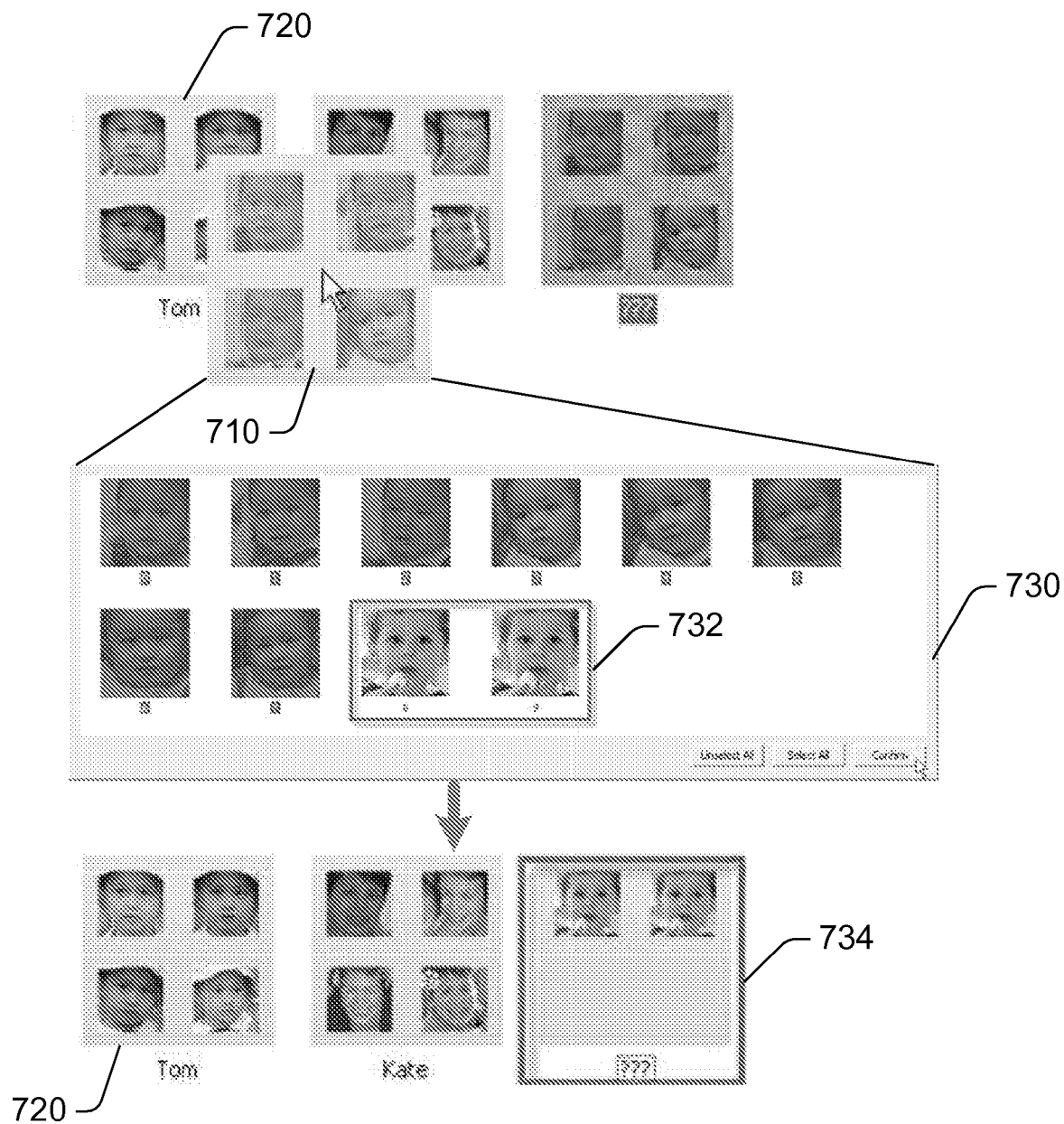
FIG. 7 shows an exemplary smart cluster merger.

FIG. 7 shows an exemplary smart cluster merger. The user drags face group 710 to face group 720 which has already labeled as "Tom". Usually, when the user drags several faces or face groups to a face group that already has a name, this indicates that the user wants to name all of the dragged items together. One simple way to accommodate this user indication is to tag all faces of the dragged face group 710 as "Tom" when face group 710 is dropped to face group 720.

However, due to the imperfection of the algorithm currently available, the dragged faces may not all belong to the same person. Dropping all these faces into an already well annotated face group may spoil the work done before. To solve this problem, the method ranks and displays the dragged faces according to their similarities to the destined face group, and allows the user to select part of the dragged face group to merge (or to unselect unwanted ones to remain separate). The selected faces are merged with the target face group, while the unselected faces are left alone and their labels unchanged.

As shown in FIG. 7, the dragged face group 710 is expanded in display view 730 which shows two faces 732 that do not belong to the target face group 720 "Tom". The expanded display view 730 may be a pop-up that appears when face group 710 is dragged to the tagged face group 724 for user confirmation. Before dropping to the target face group 720, two faces 732 are unselected, while the rest faces in the expanded display view 730 of face group 710 are selected. Upon dropping to the target face group 720, the two unselected faces 732 remain unlabeled and are found in an unlabeled group 734, while the selected faces are merged into labeled face group 720. This smart merging process helps to assign faces to the right labels as the user specifies.

Figure 8:
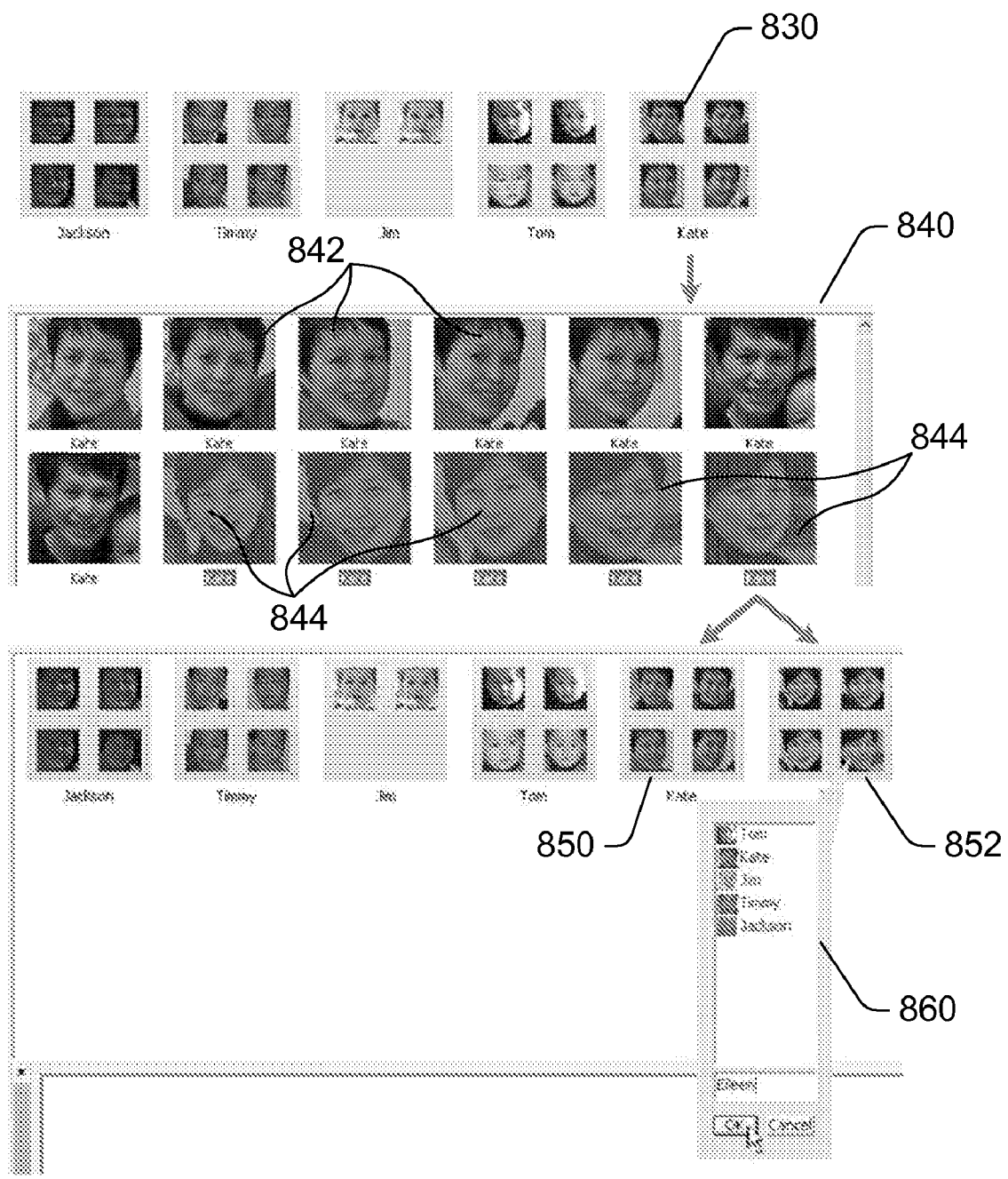
FIG. 8 shows an exemplary cluster split.

FIG. 8 shows an exemplary face group split to facilitate further annotation. Face group 830, when selected, is displayed in thumbnail view area 840 in which the faces are ranked according to face similarity for further refinement of labeling by the user. Faces 844 that are less similar to most of the faces in current face group 830 are grouped together, while other faces (such as those denoted as 842) which are more similar to each other are grouped together. This helps a user to further determining whether faces 844 really belong to the face group 830. If faces 844 actually do not belong to the current face group 830, the user may select and delete them (e.g., by simply pressing DELETE on keyboard), and the original face group 830 will be automatically split into two face groups 850 and 852. The face group 850 contains the faces 842 left in the original face group 830, while the face group 852 holds the deleted faces 844, enabling further labeling through name selector/input 860. Alternatively, the user may also select the misplaced faces 842 and move them to another existing face group by drag-and-drop.

The process shown in FIG. 8 is particularly useful after the face group 830 has just undertaken a change, such as a merge, a split or addition of faces, where the faces may be re-ranked according to face similarity for further refinement of labeling by the user.

Contextual Re-Ranking

In another aspect of the interactive photo annotation method, the system records contextual information when the user is clicking, dragging, and dropping the faces or face groups, either in browsing mode or annotating mode, and re-ranks the thumbnails in current view to enable users to accomplish interactive labeling without much scrolling the thumbnail area.

For instance, when the user clicks on a face group while browsing the face groups and clicking, the annotation program may automatically adjust the order of the face groups displayed in the current view to put similar face groups near the clicked (selected) face group. Herein, face group is a "similar face group" if it contains faces that are considered similar to the selected face group. This re-ranking arrangement makes it more efficient to merge several face groups that belong to the same person. Without this feature, the user might even not see the similar face groups or need to scroll a long way to find the similar face groups to merge.

Figure 9:
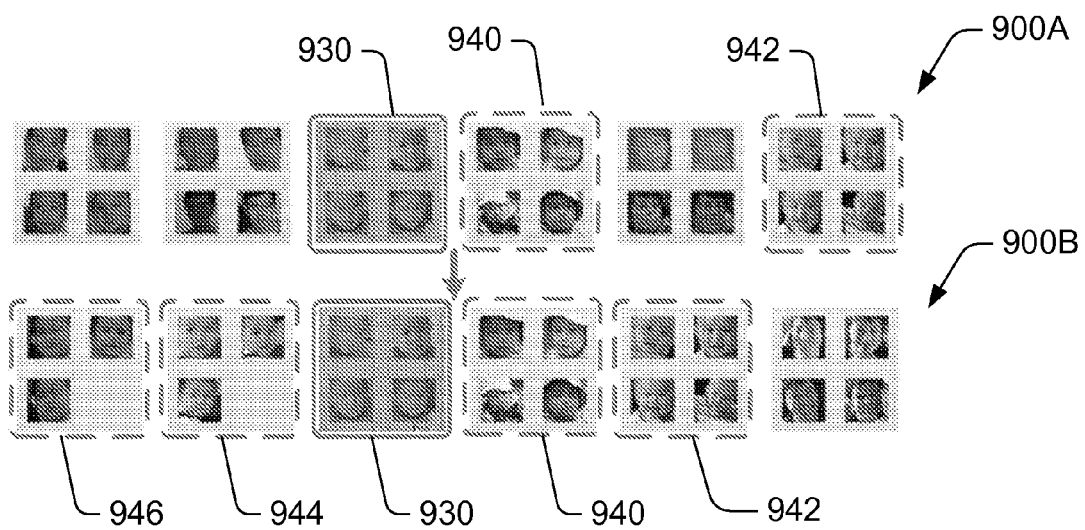
FIG. 9 shows an exemplary arrangement of face groups before and after contextual re-ranking.

FIG. 9 shows an exemplary arrangement of face groups before and after contextual re-ranking. The arrangement of the face groups before the re-ranking is denoted by 900A, while that after the re-ranking is denoted by 900B. The re-ranking is performed in relation to selected face group 930. Before re-ranking, there are only two similar face groups 940 and 942 in the neighborhood that may belong to the same person of the selected face group 930. After re-ranking, there are four such similar face groups 940, 942, 944 and 946, all positioned near the selected face group 930. Having more similar face groups near the selected face group 930 makes further merging more convenient.

Likewise, when the user browses face thumbnails in a face group, the annotation program may also arrange the face thumbnails in the face group to put the faces similar to a selected face together, to facilitate further arrangement. For example, the user may drag several similar faces together to move them to another face group, or remove the faces which are misplaced in the current face group.

Ad Hoc Annotation with Progressive Learning

The interactive photo annotation method further introduces an ad hoc annotation technique which learns from labeling (annotation) data entered by the user to improve clustering of the unlabeled data progressively. As shown in FIG. 1, ad hoc annotation may be performed at block 145 interactively with group annotation (140) and clustering (130).

The ad hoc annotation provides a relaxed environment to allow the user to casually enter annotations without being too much concerned of display orders, logic and workflow. As the user casually annotates photos while browsing and retrieving photos, the annotation information is gradually accumulated, and the annotation program in return continuously improves the clustering, browsing, and retrieval performance. Unlike previous static annotation systems in which labeled data do not affect unlabeled data, the present method improves its performance dynamically.

In addition, the ad hoc annotation helps the user label photos freely at a casual pace while seeing the system improve with the user input. As the user sees the improved browsing and retrieval results as an apparent result of his or her input, the user is further encouraged to annotate more photos and clusters. This turns a tedious job into a fun game.

When the photo album to be labeled is large and contains many subjects, ad hoc annotation allows filtering as a preface to clustering to improve automatic clustering results. The users can label the large album hierarchically by first filtering the album using some selection criteria (such as time span), then carrying out clustering on the filtered photo groups which have manageable sizes.

Moreover, ad hoc annotation allows the users to annotate as they browse and search. In one embodiment, the system automatically extracts content features based on image appearances, and therefore browsing and searching can be started based on the extracted features before any manual annotation information have been entered. The user can perform a search and then label the search results. The user may also enjoy improved search as a fruit of labeling.

Semi-Automatic Location and Event Annotation

Similar to the face annotation, the program may also enable location and event annotation. In location and event annotation, the program may take into consideration the analysis of photo appearance, including color model and texture, in addition to the time and GPS in formation in JPEG tags.

Except for using different features (e.g., scene information rather than facial features) to conduct automatic clustering, the location and/or event annotation can be implemented in a way similar to how the face annotation is implemented. The location and event annotations may be combined with face annotation for better management of photo album.

The feature of semi-automatic location and event annotation makes it possible to recognize different locations in similar dates, which is especially useful when the photo album consists of photos taken by different people at the same date, or the photographer travels and takes pictures of different places in one single day.

Figure 10:
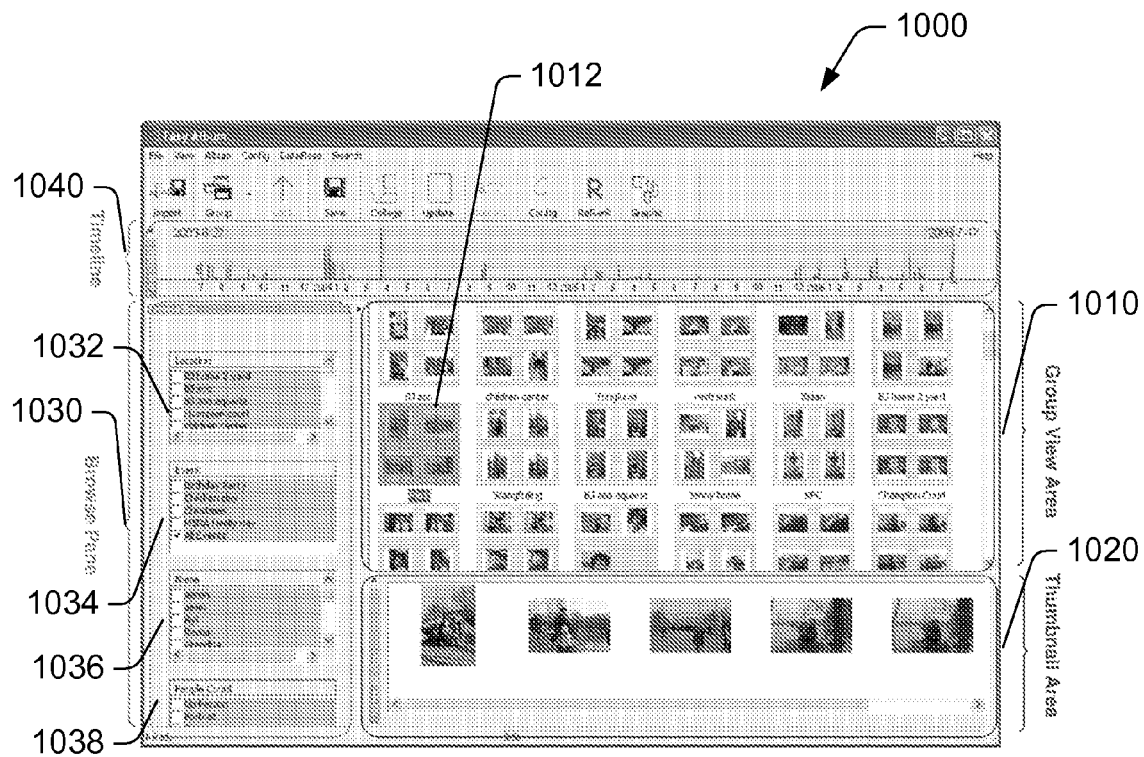
FIG. 10 shows an exemplary user interface (UI) implementing face annotation and location/event annotation.

FIG. 10 shows an exemplary user interface (UI) implementing face annotation and location/event annotation. The user interface 1000 has group view area 1010, thumbnail area 1020, browse area 1030 and timeline 1040, the functions of which are described in further detail below. As shown in FIG. 10, the program enables a 5-dimensional photo exploration to allow the user to browse the photo albums along five different dimensions or their combinations. These five dimensions include timeline 1040, location selector 1032, event selector 1034, name selector 1036 and people counter 1038.

Timeline 1040 is designed to give the user a brief view of the distribution of photos with respect to time. The user can specify an interval and view the photos within timeline 1040. The other four dimensions (location, event, name, and people count) in the photo are integrated in browse pane 1030.

As the user makes a selection of one or any combination of the five dimensions (selectors), photos satisfying the selection criteria are displayed in group view area 1010. As the user selects a group (e.g., 1012) in the group view area 1010, thumbnails of individual photos of the selected group are displayed in thumbnail area 1020.

Browsing and Searching Based on Interactive Annotation

In one embodiment, the program has a browsing mode and annotation mode which can be selected or toggle by the user. The browsing mode allows the user to search and view the photos quickly. Because clustering tends to be computationally intensive, the clustering may be turned off in the browsing mode to make the browsing speedy. The clustering may be turned on only when the user enters into annotation mode and selects a certain photo set to be annotated. The user may browse thousands photos but only select hundreds for clustering-based annotation.

Figure 11:
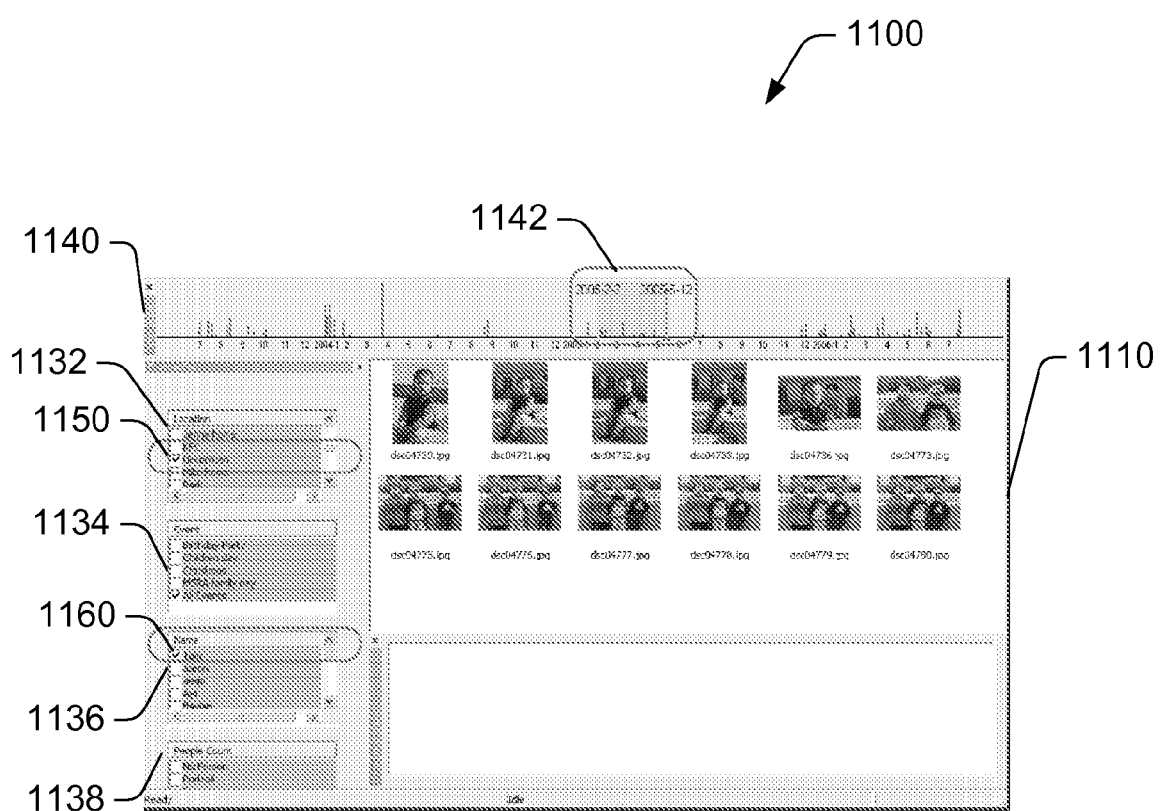
FIG. 11 shows an exemplary result of browsing the photos satisfying user selected conditions.

FIG. 11 shows an exemplary result of browsing the photos satisfying user selected conditions. In the result shown, the user has selected a time period 1142 (from Feb. 2, 2005 to May 12, 2005) in timeline 1140, a particular location 1150 in location selector 1132, a name 1160 ("Tom") in name selector 1136, but chose "all events" and no restriction on people count. Photos satisfying such conditions are displayed in view area 1110. In this particular embodiment of the browsing mode, view area 1110 is used for displaying individual photos. However, it may also be used for displaying photos in groups.

Furthermore, since the system has obtained both photo feature and semantic tag information from preprocessing and interactive labeling stages, semantic search (such as a search for photos that contain some specified people) and feature similarity search (such as a search by face similarity) are made easy.

Figure 12:
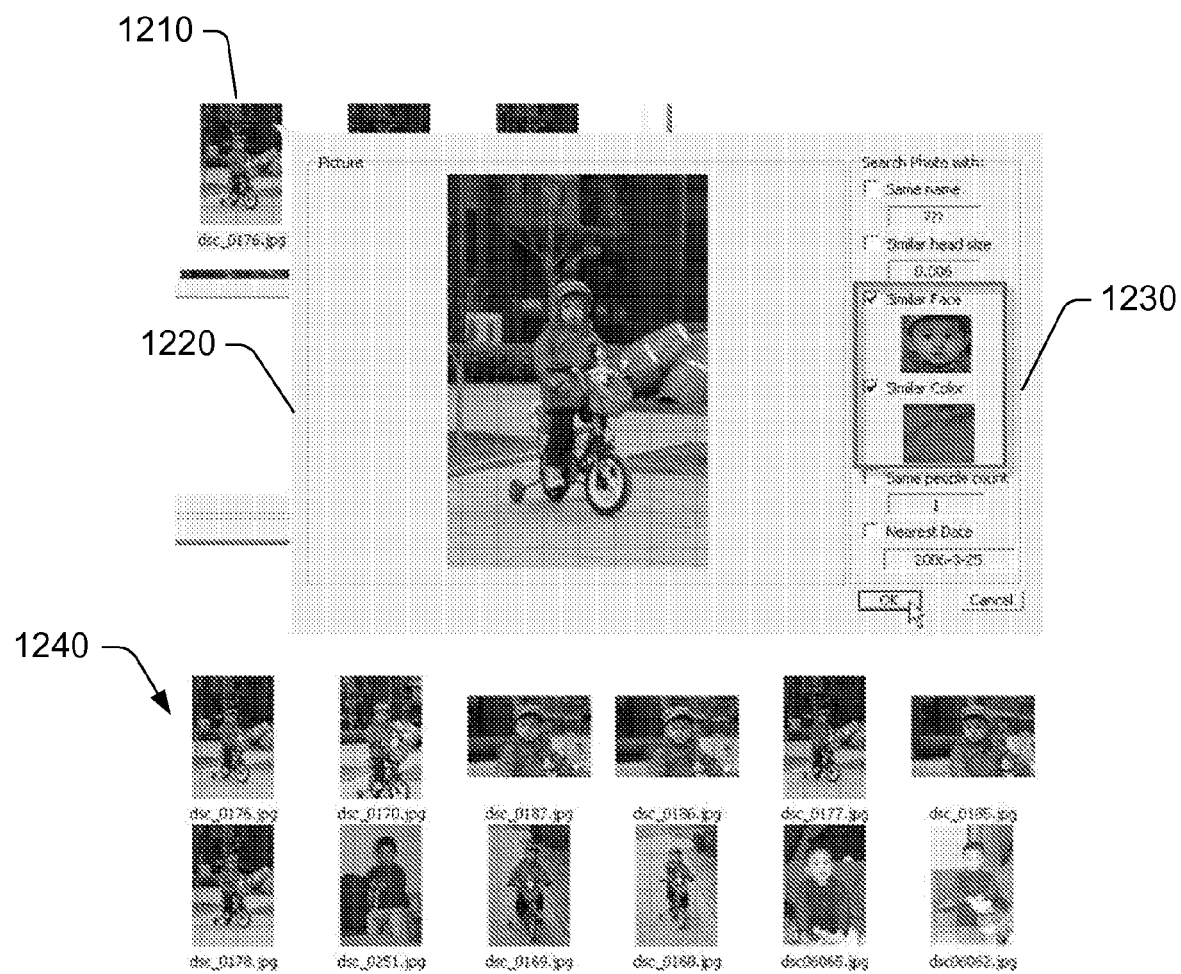
FIG. 12 shows and exemplary UI for searching based on the selection of a single photo. The exemplary UI has right-clicking on a photo and selecting a search by face and cloth similarity.

FIG. 12 shows an exemplary UI for searching based on the selection of a single photo. The exemplary UI has right-clicking on a photo and selecting a search by face and cloth similarity. As the user selects thumbnail 1210, a display window 1220 pops up to show the corresponding photo accompanied by a search input selector 1230, which allows the user to select a variety of search criteria such as name, and size, face feature, color, people count and date. The results of the search are displayed in area 1240. For example, the photos retrieved may contain the same person (Tom) wearing clothes of a similar color.

It should be noted that no prior tagging information is required for performing searches at this stage. Therefore, there is no need to wait for annotation to use search feature. The search and annotation can be iteratively conducted in the system.

Exemplary System

Interactive photo annotation method and UI are developed to help user annotate photos semi-automatically by leveraging the state-of-the-art computer vision technologies. Any suitable computer vision technology (such as face recognition technology, photo content extraction technology and clustering technology), including the existing ones and those that may be developed or improved in the future, may be used for implementing the interactive photo annotation method and UI disclosed herein.

Figure 13:
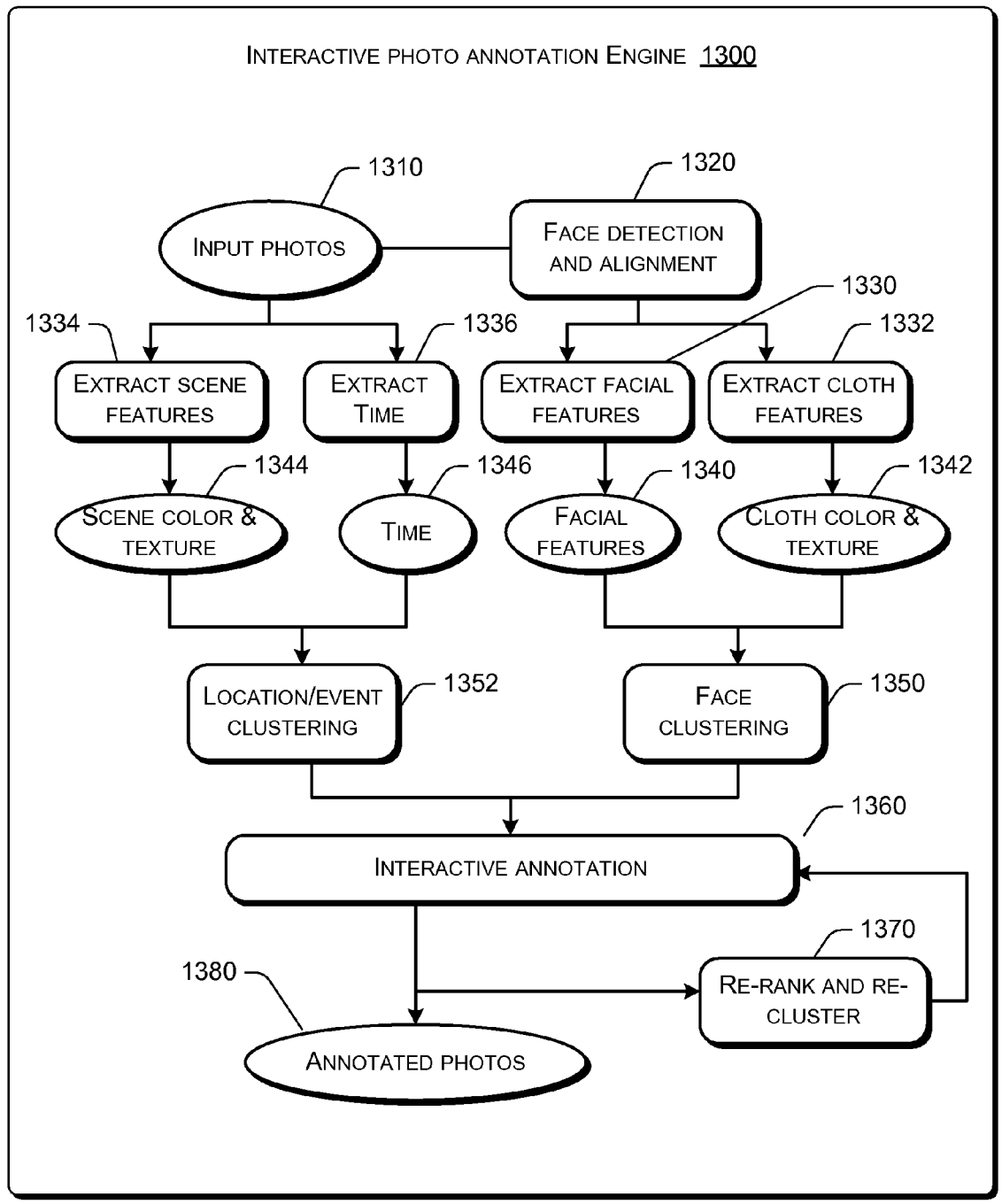
FIG. 13 is a block diagram of an exemplary system framework used in the interactive photo annotation method.

FIG. 13 is a block diagram of an exemplary system framework used in the interactive photo annotation method. The system is represented by interactive photo annotation engine 1300 which has a three-stage architecture, including offline preprocessing (blocks 1310-1346), online clustering (blocks 1350 and 1352), and online interactive labeling (blocks 1360 and 1370), to obtain an annotated photo album (block 1380).

The offline stage starts with inputs photos at block 1310. In one embodiment, the system performs facial feature extraction and location/event featuring extraction in parallel. To perform facial feature extraction, the system goes to block 1320 where face detection and alignment is done. The system then extracts facial features (blocks 1330 and 1340), and may also extract cloth features (blocks 1332 and 1342). An exemplary extractable facial feature is local binary pattern (LBP) feature, which is a widely used feature for face recognition. An exemplary extractable cloth feature is cloth contexture feature such as Color Correlogram feature extracted from the human body area.

To perform location/event feature extraction, the system goes to block 1334 to extract scene features such as scene color and texture 1344, and goes to block 1336 to extract time features such as time tags 1346. An example of scene features is Color Correlogram feature which is widely used in content-based image retrieval (CBIR) applications to describe the color and texture information. Typically, a time feature can be extracted from the meta-data of image files directly.

In the online clustering stage, the system performs face clustering at block 1350 using facial features 1340 and cloth color and texture 1342. In some embodiments, photo time information 1346 may also be used to assist face clustering. The system performs location/event clustering at block 1352 using scene color and texture 1344 and photo time 1346. In one embodiment, an enhanced version of spectral clustering algorithm which can handle noise data is applied on the extracted features to group similar faces into clusters, or group similar photos with similar scenes. For face clustering, the system may produce multiple clusters for a single person to address the face diversity. Clusters of the same person can be then manually combined by a few drag-and-drop operations.

In the online interactive annotation stage, the system performs interactive annotation at block 1360 in combination with re-ranking and re-clustering at block 1370. In one embodiment, two kinds of ranking technologies, called intra-cluster ranking and inter-cluster ranking, are used. Intra-cluster ranking reorders the faces in each cluster so that faces with more confidence are put in front. Inter-cluster ranking rearranges clusters so that better clusters are put in front and similar clusters are put together to reduce user operations.

Both intra-cluster and inter-cluster re-ranking technologies dynamically change spatial configuration of photos/clusters according to the newly-input ground-truth (facts) from the user. These methods can be implemented by supervised learning method, such as linear discriminant analysis (LDA), support vector machine (SVM), or simple nearest-neighbor. In some embodiments, a simple and efficient nearest-neighbor approach is used for re-ranking, because in many cases, simple method tends out to produce more stable results with a smaller number of training samples.

Exemplary Environment

The above-described techniques may be implemented with the help of a computing device, such as a personal computer (PC).

Figure 14:
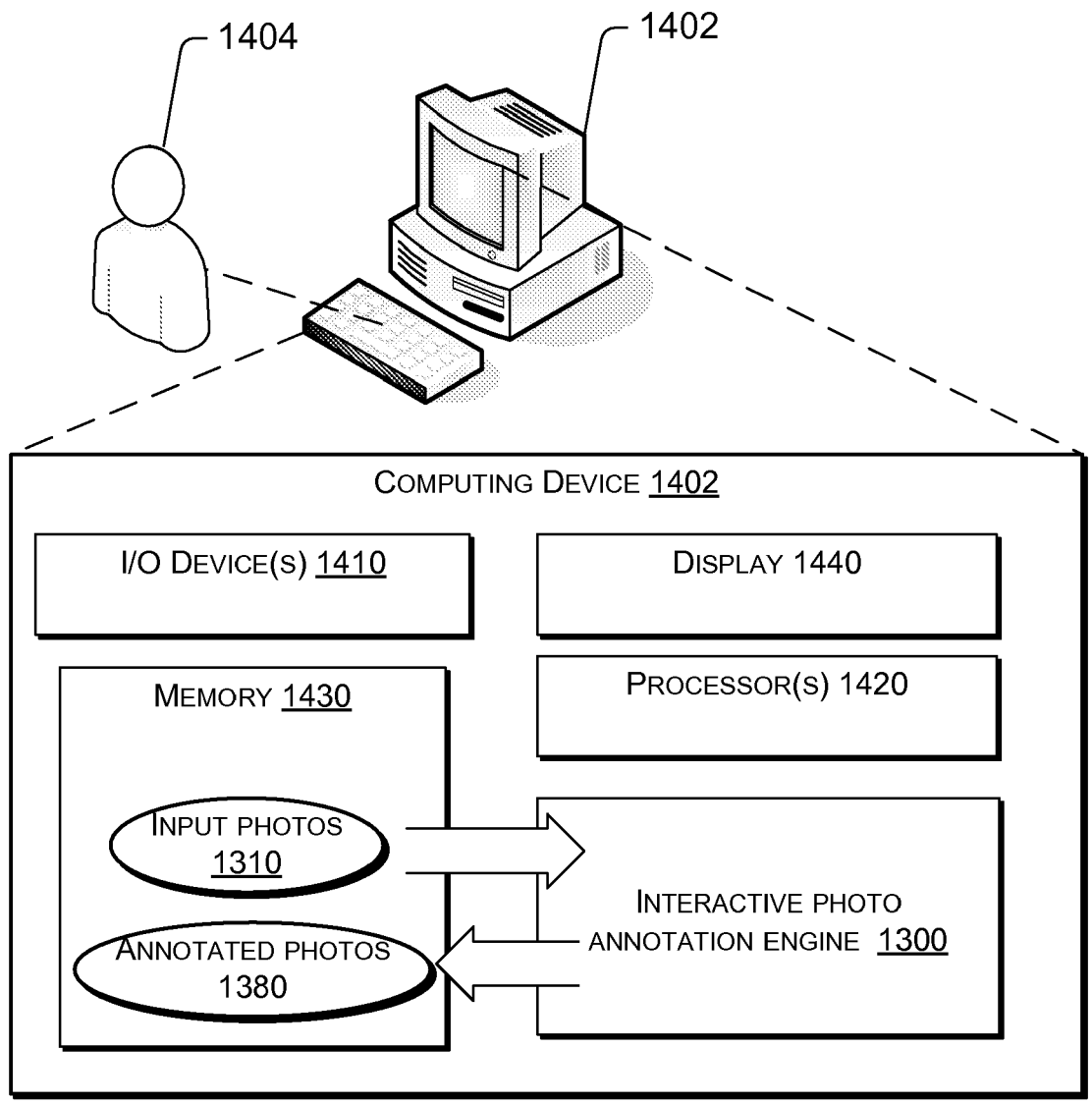
FIG. 14 shows an exemplary environment for implementing the interactive photo annotation method.

FIG. 14 shows an exemplary environment for implementing the interactive photo annotation method. The interactive photo annotation engine 1300 of FIG. 13 is implemented with a computing device 1402 operated by user 1404. The computing device 1402 includes I/O devices 1410, processor(s) 1420, memory 1430 and display 1440. The memory 1430 may be any suitable computer-readable media. The interactive photo annotation engine 1300 (FIG. 13), including input photos 1310 and output annotated photos 1380, is implemented in the computing device 1402.

In general, the above-described techniques may be implemented with the help of one or more computer-readable media (e.g., memory 1430) containing computer-executable instructions. The computer-executable instructions enable a computer processor (e.g., processor 1420) to perform actions in accordance with the techniques described herein. These actions include extracting facial features; clustering the photo album into face groups based on facial similarity; and associating an annotation with a face group.

It is appreciated that the computer readable media may be any of the suitable memory devices for storing computer data. Such memory devices include, but not limited to, hard disks, flash memory devices, optical data storages, and floppy disks. Furthermore, the computer readable media containing the computer-executable instructions may consist of component(s) in a local system or components distributed over a network of multiple remote systems. The data of the computer-execomplete instructions may either be delivered in a tangible physical memory device or transmitted electronically.

It is also appreciated that a computing device may be any device that has a processor, an I/O device and a memory (either an internal memory or an external memory), and is not limited to a PC. For example, a computer device may be, without limitation, a set top box, a TV having a computing unit, a display having a computing unit, a printer or a digital camera.

Test Examples and Performance

A photo annotation program called EasyAlbum based on the method described herein has been tested in a user study to compare with Adobe® Photoshop® Elements 4.0, which is representative of existing album management software programs including ACDSee™ Pro 3.0 and iView Media Pro 3.1 (a Microsoft® Expression® Media product).

All of the software applications above provide features of creating tags, dragging and dropping photos and exploring according to tags. Adobe Photoshop Elements 4.0 also has a special feature that can automatically detect faces in photos and allow users to directly label the detected faces instead of the original photos.

In tests using a large personal album with ground-truth imported into the database, EasyAlbum performed favorably. One area in which EasyAlbum performed particularly well is scalability. It was observed that the time needed by Adobe® Photoshop® Elements 4.0 grows approximately linearly with the size of the album, while the time of EasyAlbum grows sub-linearly (remains almost constant for large size), demonstrating a potential advantage of the present method when used in annotation of a large album.

The test results show that using cluster annotation, a large proportion of faces can be annotated in the early stage by just a few interactions. The unlabeled faces in the "Unnamed" folder are small in number. In contrast to the one-by-one annotation UI style used in other annotation programs, the interactive photo annotation method promises significant performance improvement when annotating large albums. This bodes well for the present method considering the trends of the increasing sizes of photo albums. A typical digital photo album may contain thousands of photos with some reaching tens of thousands. EasyAlbum shows great potential in these scenarios, while programs that require linear time consumption may become prohibitive for large albums.

In tests using smaller albums, EasyAlbum also performed well in terms of annotation workload measured by 1) time cost comparisons while annotating all photos in the album; and 2) performance comparisons while doing annotation in a given time limit. During the process of labeling, the mouse and keyboard activities, including number of clicks of the mouse, number of strikes of the keyboard, and total distance of the mouse cursor movement are recorded. These statistics are used to indicate the effort needed to annotate the album for the purpose of evaluating the annotation performance of each test.

According to user experiences, repeated drag-and-drop operation is a rather boring part of labeling photos, while the clicking of mouse is less concerned. In this respect, tests that measure the distance of mouse movement also shows potential advantages of EasyAlbum.

One of the improvements of EasyAlbum is that it allows drag-and-drops between face groups nearby, while other annotation programs require the user to drag photos or faces to the side pane in the UI, which is usually quite a distance away. Furthermore, EasyAlbum puts similar clusters/faces/photos close to each other, while other programs require the user to scroll the view area to find similar groups/faces/photos. These differences count for shorter mouse distances in EasyAlbum. The repeated operation of long distance mouse moves may reduce the user experience, especially when the album is large and labeling job becomes boring.

In summary, the present interactive photo annotation method performs favorably in cases of both large scale and small scale. For very large albums, the method provides a solution in tolerable time limit. For small albums, the method requires shorter mouse movement, and may produce the same yield in less time.

Conclusion

The interactive photo annotation described herein enables efficient photo labeling (annotation) in digital photo albums through simple and easy-to-use interactions. Face clustering-based labeling technique reduces workload of labeling people names in photos. Contextual re-ranking provides an environment adaptive to user's interaction with the system, and further boosts labeling productivity. Ad hoc clustering enables users to cluster and annotate freely when exploring and searching in the album, and allows the program to progressively improve the performance.

It should be noted, however, the claimed subject matter is not limited to implementations that demsonstrate and or all of the noted advantages, nor limited to implementations that solve any or all of the noted disadvantages of the conventional methods.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A computer-implemented method comprising:
   extracting facial features of a collection of digital photos;
   clustering the collection of digital photos into a plurality of face groups, at least first and second face groups of the plurality of face groups each including multiple digital photos, each photo having a facial feature satisfying a programmed facial similarity requirement;
   associating an annotation with the at least first face group;
   adding the second face group to the first face group; and
   responsive to the adding, automatically associating the second face group with an annotation of the first face group.

2. The method as recited in claim 1, wherein the multiple digital photos each has a torso feature satisfying a programmed torso similarity requirement.

3. The method as recited in claim 1, wherein the multiple digital photos each has a photo time feature satisfying a programmed photo time similarity requirement.

4. The method as recited in claim 1, wherein the facial similarity requirement comprises a facial similarity level at or beyond which the facial features of the multiple digital photos are considered that of a person of same identity, and wherein the annotation comprises an identifier of the person.

5. The method as recited in claim 1, wherein clustering the collection of digital photos comprising:
   automatically clustering the collection of digital photos by applying a face clustering algorithm.

6. The method as recited in claim 1, further comprising:
   receiving from a user at least one ad hoc annotation for a plurality of digital photos in the collection of digital photos; and
   clustering the collection of digital photos based on the at least one ad hoc annotation received from the user.

7. The method as recited in claim 1, further comprising:
   modifying a face group of the plurality of face groups by removing a photo from the face group; and
   disassociating the removed photo with the annotation of the face group.

8. The method as recited in claim 1, further comprising:
   automatically merging face groups of the plurality of face groups if the face groups are associated with an identical annotation.

9. The method as recited in claim 1, further comprising:
   displaying in a first view area an image representation of the at least one face group, the image representation being selectable by a user to select the at least one face group; and displaying in a second view area thumbnails of the multiple digital photos of the at least one face group when selected by the user.

10. The method as recited in claim 1, further comprising:
allowing a user to select a target face group from the plurality of face groups;
ranking the plurality of face groups according to face similarity of each face group to the target face group; and
displaying the plurality of face groups according to a result of the ranking.

11. The method as recited in claim 1, further comprising:
allowing a user to select a target face group from the plurality of face groups;
allowing the user to select a target photo from the target face group;
ranking photos of the target face group according to face similarity of each photo to the target photo; and
displaying the photos of target face group according to a result of the ranking.

12. The method as recited in claim 1, further comprising
clustering the collection of digital photos into a plurality of event/location group; and
associating an event/location annotation with the at least one event/location group.

13. A graphical user interface for adding annotations to a photo album, the graphical user interface comprising:
a group view area in which a plurality of face groups of the photo album are displayed, each displayed face group being selectable by a user, wherein the displayed face groups are enabled for a drag-and-drop operation to merge two or more face groups; and
an annotation input interface via which a user can enter an annotation for a selected face group.

14. The graphical user interface as recited in claim 13, further comprising a thumbnail area in which thumbnails of a plurality of photos of a selected face group are displayed.

15. The graphical user interface as recited in claim 14, wherein the displayed thumbnails are enabled for a drag-and-drop operation to remove a corresponding photo from the selected face group or to move a corresponding photo to another face group.

16. The graphical user interface as recited in claim 13, wherein the annotation input interface comprises:
an annotation field listing existing annotations enabled for selection by the user to be the annotation of the selected face group.

17. The graphical user interface as recited in claim 13, wherein the annotation input interface comprises:
an annotation field via which the user can manually enter the annotation for the selected face group.

18. One or more computer storage devices having stored thereupon a plurality of instructions that, when executed by a processor, perform operations including:
extracting facial features of a collection of digital photos;
clustering the collection of digital photos into a plurality of face groups, at least first and second face groups of the plurality of face groups each including multiple digital photos, each photo having a facial feature satisfying a facial similarity requirement;
associating an annotation with the at least first face group;
adding the second face group to the first face group; and
responsive to the adding, automatically associating the second face group with an annotation of the first face group.

* * * * *